United States Patent
Benzon et al.

(10) Patent No.: US 7,107,068 B2
(45) Date of Patent: Sep. 12, 2006

(54) SYSTEM AND METHOD FOR PROVISIONING OF TEXT MESSAGE SERVICES

(75) Inventors: Roland A. R. Benzon, Makati (PH); Jeoffrey R. Lao, Pasig (PH); Erik L. Lacson, Makati (PH)

(73) Assignee: Sage Agent Networks PTE LTD, Singapore (SG)

( * ) Notice: Subject to any disclaimer, the term of this patent is extended or adjusted under 35 U.S.C. 154(b) by 0 days.

(21) Appl. No.: 10/488,264

(22) PCT Filed: Jun. 14, 2002

(86) PCT No.: PCT/SG02/00121

§ 371 (c)(1),
(2), (4) Date: Feb. 25, 2004

(87) PCT Pub. No.: WO03/019959

PCT Pub. Date: Mar. 6, 2003

(65) Prior Publication Data
US 2004/0244102 A1    Dec. 9, 2004

(30) Foreign Application Priority Data
Aug. 27, 2001   (SG)   .............................. 200105215-8

(51) Int. Cl.
*H04Q 7/20* (2006.01)

(52) U.S. Cl. .................................... 455/466; 455/414.1
(58) Field of Classification Search ................ 455/466, 455/414.1, 414.4, 417, 412.1, 412.2; 709/206, 709/204
See application file for complete search history.

(56) References Cited

FOREIGN PATENT DOCUMENTS

WO       WO 98/56195     * 12/1998

* cited by examiner

*Primary Examiner*—Eliseo Ramos-Feliciano
*Assistant Examiner*—Wayne Cai
(74) *Attorney, Agent, or Firm*—Intellectual Property Law Group LLP; Otto O. Lee; Juneko Jackson (57) ABSTRACT

A system (1) which allows content providers of value-added SMS services to set-up their own services comprises a Small Message Entity Agent (SMEA) (6) which is coupled to a Short Message Service Centre (4) of a cellular radio telephone network. Providers of value added services can access the SMEA to register a unique identifier in the form of an easily remembered name, which is then translated into a numerical number, which is used as part of the destination address in text messages destined for the content provider. The content provider is able to self-configure his service so that text messages delivered to the SMEA are forwarded to selected message handlers for forwarding to appropriate destinations, such as email addresses, pagers or mobile phones.

5 Claims, 6 Drawing Sheets

SYSTEM AND METHOD FOR PROVISIONING OF TEXT MESSAGE SERVICES

FIELD OF THE INVENTION

The present invention relates to the provisioning of value-added text messaging services using, for example, the Short Message Service (SMS) available through the Global System for Mobile Communication (GSM) protocol for cellular radiotelephone networks.

BACKGROUND ART

In GSM cellular radio telephone networks the Short Message Service (SMS) is a service that enables a user to send text messages to, and receive text messages from, other users using remote terminals such as their mobile cellular radiotelephones—hereinafter referred to as Mobile Stations (MS). The SMS function attempts to deliver a message to a mobile station (MS) whenever the mobile station is registered to the network, even when the terminal is engaged in a voice or data call. The mobile station may also roam throughout the network and still be capable of sending and receiving messages A mobile station configured for SMS provides methods for the user to receive, read, write/edit, clear, send, and save messages.

When a mobile station is switched off or not within range, then the text message is stored until the mobile station is able to receive the message. The network stores messages in at least one SMS Center (SMSC), and messages are sent to the mobile station from the SMSC. SMSC's are used to route SMS messages and are linked to network service centers. Various SMS protocol layers receive the messages and check their contents. If the contents are valid, and assuming that there is room for incoming text messages in the memory of the mobile station, the message is received and stored. Otherwise, the message is rejected.

Reference can be had to the TIA Interim Standards IS-136 and IS-37, and also to a document entitled "TDMA Forum, Implementation Guide: Short Message Service Terminals Compliant With IS-136 and IS-137" (Ed. D. Holmes, vers. 7.0, Apr. 20, 1995). U.S. Pat. No. 5,915,222: "Transporting Short Message Service (SMS) Messages Within a Telecommunication Network" likewise describes the Short Message Service—the components, their functions, and how they relate to other components and the system as a whole. These documents specify a type of SMS and the various system and terminal level protocols required to provide SMS in a cellular telecommunications system.

It is also possible for users to send text messages from Internet web sites—known as SMS gateways. SMS messages may also be sent from a mobile station to computer applications running on servers—commonly referred to as an External Short Message Entity (ESME)—and vice versa. In this instance, the SMSC (Short Message Service Center) receives the SMS message from the cellular network, or from an internet gateway, respectively, and then immediately forwards the message to either the ESME—which is typically stationary and constantly connected—or to an addressed mobile station (if it is reachable)—depending upon which direction the text message is being transmitted.

Reference can be had to the 3rd Generation Partnership Project's Technical Specification Document No. 3G TS 23.039 version 2.0.0: "Interface protocols for the connection of Short Message Service Centres' (SMSC's) to Short Message Entities (SMEs)" which formally specifies how a third party—commonly referred to as a value-added service—can provide value-added content, such as information, communication, or computing services—and can interface ESME applications with the cellular radio telephone network's SMS system.

Examples of ESME applications include:

Alerts originating from a Voice-Mail server indicating voice messages at a customer's mailbox.

Messages originated from terminals at a corporate customer's site.

An ESME sends or requests a "Delivery Receipt".

When an ESME—either acting on its own behalf, or as an intermediary for other ESME's—establishes communication with the SMSC, two 'virtual connections' are required. One is used for messages originating in the ESME, and the response messages for them. (e.g., submit short message, query short message, cancel short message, etc.), while the other is used for messages originating in the SMSC and their responses (e.g., deliver short message). A latter "virtual connection" is known as a Bind operation—in the form of a Bind request.

The purpose of the Bind operation is to register an instance of an ESME with the SMSC system. As such, the Bind request must provide key information—parameters—within the "message" field of the protocol message. One particular parameter that is used is the address_range, which is used for routing SMS messages and delivery receipts to an ESME.

Where an ESME is acting as an intermediary to other ESME's they are generally referred to as an SME Agent (SMEA). In this case, the SMEA specifies a range of ESME addresses that it wishes to serve—that is, all the addresses of end-ESME's that it will act on behalf of. This range of address is a "regular expression". The "regular expression" in this context is a text pattern representing a range of addresses or a specific address. This may be defined explicitly in the bind request or configured by SMSC administration. These terms are specifically used for the SMPP interface implementations of the Logica Corporation. Different SMSC manufacturers use different SMSC interface implementations, but it will be understood that the communication between SMSC's and SMEA's/ESME's are—essentially—similar whatever interface implementation is used.

Cellular radiotelephone network operators typically allocate a three or four-digit numerical address (commonly referred to as an SMSC "access code") to ESME's. This access code is used by the SMSC to identify the ESME to which an SMS message is to be routed. While an end-ESME would typically be assigned a singular SMSC access code like "2345" so that only messages sent to "2345" will be sent to it, an intermediate SMEA will need more than one access code because it serves a number of end ESME's. This multiple access code will typically specify a range of addresses—indicated by a regular expression in the form of "2345*" (note the asterisk), where the asterisk indicates a range of addresses all served by an SMEA with the access code "2345" i.e. this range for instance, refer to all addresses beginning with "2345".

We refer to the group of numbers represented by the asterisk, "*", in "2345*" as a suffix—that is the string of numbers that immediately follow the access code. Each end ESME—for a particular SMEA—will therefore relate to a different suffix A problem exists with the current approach for provisioning value-added services—as provided through ESME's—in that the process is often carried out manually. Presently, the network operator has to configure their SMS system, Issue an access code, password, and specify other technical parameters, before the content provider's ESME becomes functionally connected. Occasionally, a Wireless Application Service Provider (WASP) intermediates to facilitate the process. But even in such cases, the burden is merely shifted away from the content provider.

A further problem relates to the centralized control that cellular radiotelephone network operators have over the kind of value-added services offered. Although it can be argued that that is the operator's prerogative, users can benefit more from a market economy of content providers. Policy aside, the current provisioning infrastructure is too centralized to foster an Internet-like diversity of services.

Mobile subscribers, i.e. users, encounter a different set of problems. Consider the prior art described in the U.S. Pat. No. 6,230,004. This patent discloses a common SMS value-added service request, where a subscriber sends a message, comprised of keywords (sometimes cryptic, like SPR for Stock Price) and/or parameters such as a symbol of a traded stock (which are already cryptic on their own), to a content provider. The latter, in turn, replies with the result of the operation (i.e., the content service requested).

As content providers grow in numbers, it becomes increasingly difficult to remember keywords, parameters, and the prescribed format with which these must be ordered within the message (e.g., keyword, followed by city, followed by date, etc.).

A Subscriber Identification Module (SIM) Tool Kit (STK) is a card pre-loaded with menus of value-added services. This provides some advantages, but this too is not without a cost; a subscriber must still physically trade-in the old SIM card, pay for a new SIM Tool Kit, and upgrade yet again once new STK's are issued.

Lastly, users are the least empowered of the messaging entities. Network operators determine the portfolio of services offered to their subscribers, and content providers control how services are used, thereby prescribing keywords, parameters, etc.

SUMMARY OF THE INVENTION

According to a first aspect of the present invention, there is provided a method for handling text messages, within a text messaging system, the message being intended for a recipient, and the text message including means for uniquely identifying the provider of a text message service, the method including the steps of identifying the text message service provider from the text message, determining one or more message handlers provided in the system, and associated with the service provider, and forwarding the text message to one or more appropriate destinations in accordance with the determined message handlers.

Preferably the message handlers to be associated with the text message service provider are selected by the message service provider.

Preferably, the unique identifier is a numeric code and is part of the destination address included with the text message, and wherein the unique identifier comprises a portion that is a numeric translation of a word selected, and input to the system, by the service provider.

Preferably, the method further includes the steps of translating the word to its numeric equivalent in accordance with a predetermined algorithm, combining the numeric translation with an access code to provide a message, address which is included in the destination address, and checking the message address against those stored in a first database means in the system, and, if no match is detected, storing the message address in the first database means.

According to a second aspect of the present invention, there is provided a system for handling text messages, the text messages including means for uniquely identifying a provider of a text message service, the system comprising one or more message handling means for processing and forwarding text messages received by the system, first database means storing a list of the unique identifiers for the providers of text message services, a second database means for storing details of the message handling means selected for each uniquely identified provider, and control means operable, upon receipt of a text message, to identify the service provider from the unique identifier, and to determine the selected message handling means so that the text message is forwarded to one or more appropriate destinations in accordance with the determined message handling means.

Preferably, the control means is accessible by the text message service provider to select required message handling means, the control means being operable to store details of the selected message handling means in the second database.

Preferably, the unique identifier is a numeric code and is part of the destination address included with the text message.

Preferably, the unique identifier is generated by the control means in response to a word input to the control means by the service provider.

Preferably, the unique identifier comprises a portion that is a numeric translation of the word.

Preferably, the system further includes a third database means for storing details of numeric translations of input words, and wherein the control means is operable, in response to the input word, to translate the word to it's numeric equivalent in accordance with a predetermined algorithm, to combine the numeric translation with an access code to provide a message address which is included in the destination address, and to check the message address against those stored in the third database, and. If no match is detected to store the message address in the first database means.

According to a third aspect of the present invention, there is provided a method of provisioning a text message service in a text messaging system, the method comprising the steps of registering a unique identifier for the service, configuring the service to handle messages, and storing the configuration of the selected message handlers, for the unique identifier.

This has the advantage of providing a system and a method that allows content providers to activate, and later maintain, a service by themselves, directly, remotely, and automatically.

A facility that would allow self-provisioning of services presents several advantages: Because the facility is network-based, it is highly accessible; because it decentralizes provisioning control, it promotes diversity in content; and because it is fully automated, it is highly efficient.

BRIEF DESCRIPTION OF THE DRAWINGS

The invention will now be described, by way of example only, with reference to the accompanying drawings, of which.

DETAILED DESCRIPTION OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Figure 1:
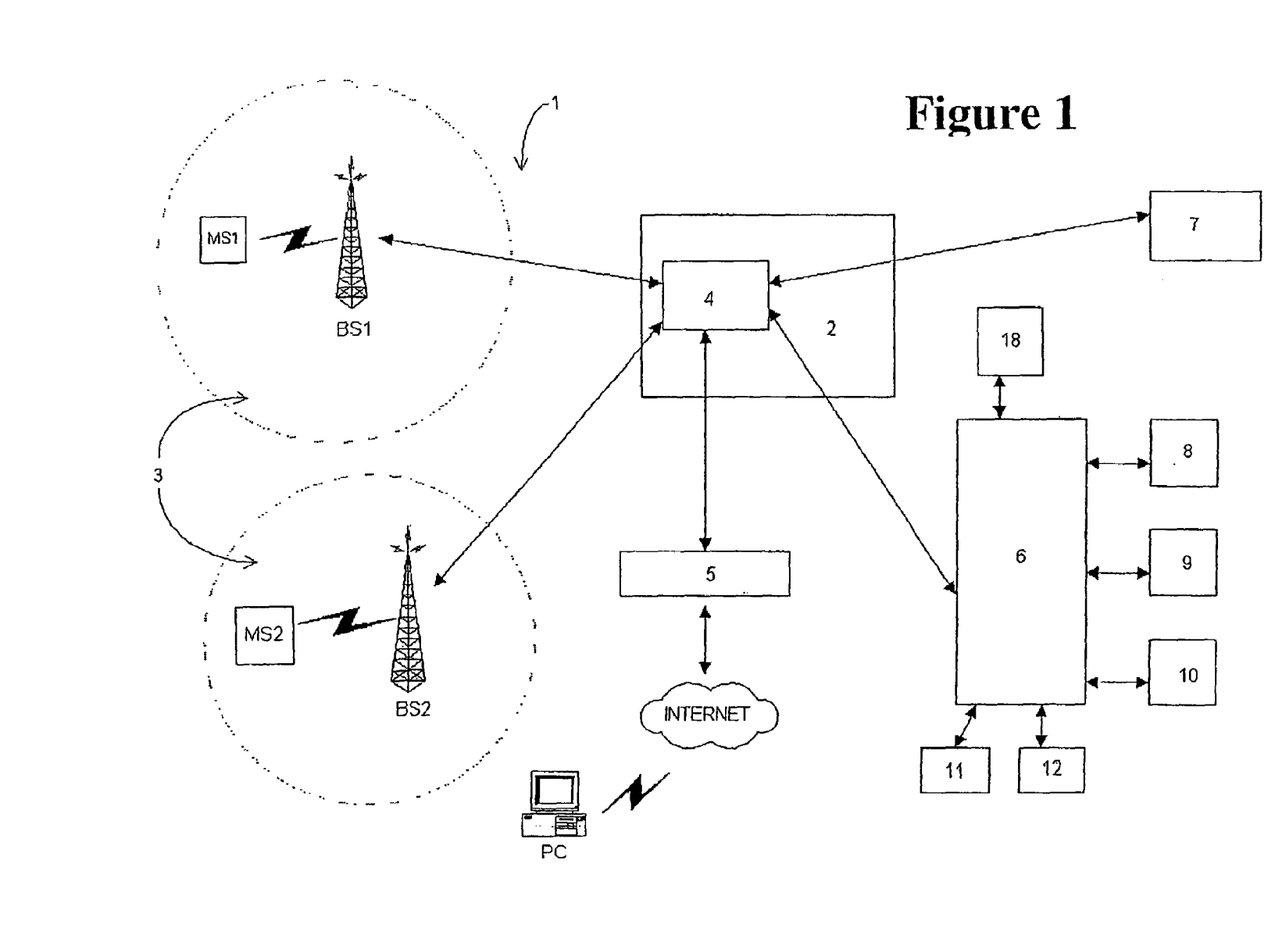
FIG. 1 is a schematic illustration of a cellular radiotelephone network incorporating a short message service facility with content providers.

A cellular radiotelephone network 1 includes all the features of known cellular radiotelephone networks—including a number of base stations BS1, BS2, and a network service centre 2. The network 1 comprises a number of "cells" 3—each cell 3 being served by a base station. Mobile stations MS1, MS2 can roam within the network 1, and are in communication with the base station serving the cell in which they are located—provided that they are in an active mode or a standby or "listening" mode. Thus, the mobile stations MS1, MS2 are able to send and receive signals to and from the base stations BS1, BS2 to transmit data—such as audio, control and text data—to the service centre 2, and from there to its intended recipient, such as other mobile stations, or servers such as Internet servers. In this embodiment, the cellular network is a GSM network. GSM cellular radio telephone networks, the operation of the networks, and the terminals using the networks are well known to persons skilled in the art, and therefore need not be described in any further detail herein, except in so far as is relevant to the present invention.

The network operator provides a short message service (SMS) on the network 1, and, in this regard, the network service centre 2 includes a short message service centre (SMSC) 4 that is operable to manage the SMS functions of the network 1. In particular, the SMSC 4 receives SMS messages from a variety of sources, identifies the sender and the recipient for the message and delivers it to that recipient.

A subscriber or user of the network can send or receive text messages using the SMS provided on the network 1, for example using a mobile station MS1, MS2, or using a personal computer (PC) coupled to an SMS gateway 5 via the internet, or any other suitable means.

Content providers can provide value-added services, such as information, communication, or computing services, as data and applications run on one or more external short message entities (ESME's) 7,8,9, 10.

The ESME's 7,8,9,10 are coupled to the SMSC 4 by the Internet, telecommunications landline connection, or any suitable wide-area or global communications network.

Each ESME can either be directly coupled to the SMSC 4, as in ESME 7 in FIG. 1, or it can be coupled via a Short Message Entity Agent (SMEA) 6 intermediate of the SMSC 4 and one or more end-ESME's 8, 9, 10. Both directly-coupled ESME's 7 and SMEA 6 establish communication with the SMSC 4, by any suitable known communications protocol. Again, and as discussed in the preamble, this will depend upon the SMSC and the interface implementations.

The SMEA 6 is managed by an SMEA service provider that provides a service allowing content providers the ability to set up and configure their own value-added text messaging services—referred to herein as a Message Service. The content provider will hereinafter be referred to as a Message Service provider.

The SMEA 6 can also be coupled to more than one SMSC—including those from different network operators.

In the embodiment described herein, the SMEA 6 is separately located from the ESME's 8, 9, 10. However, one or more ESME's may be hosted by or co-located with an SMEA 6—especially if the SMEA service provider that manages the SMEA 6 also manages the ESME's.

The SMEA 6 is connected to the SMSC 4 in the same way that an end-ESME is connected directly to the SMSC 4—although the functions are different as discussed below. The SMSC-SMEA interface protocol is specified by the SMSC 4, and the SMEA-ESME interface protocol by the SMEA 6, which may be different (typically easier) than the SMSC-SMEA connection. The SMEA-ESME connection will depend upon the specific requirements of the system, but uses well-known protocols such as HTTP, SMS, SMTP—as required. The functionality of the SMEA 6 is—in a known manner—embodied in a software application, which is subsequently housed in a server. One or more servers can be used to distribute the load, if required. The servers can, likewise, be co-located in one physical facility or can be distributed amongst several locations, but networked.

The SMEA 6 can also be arranged to receive text messages from other sources—such as email 11, Wireless Application Protocol (WAP) terminals 12, or the Internet.

Figure 2:
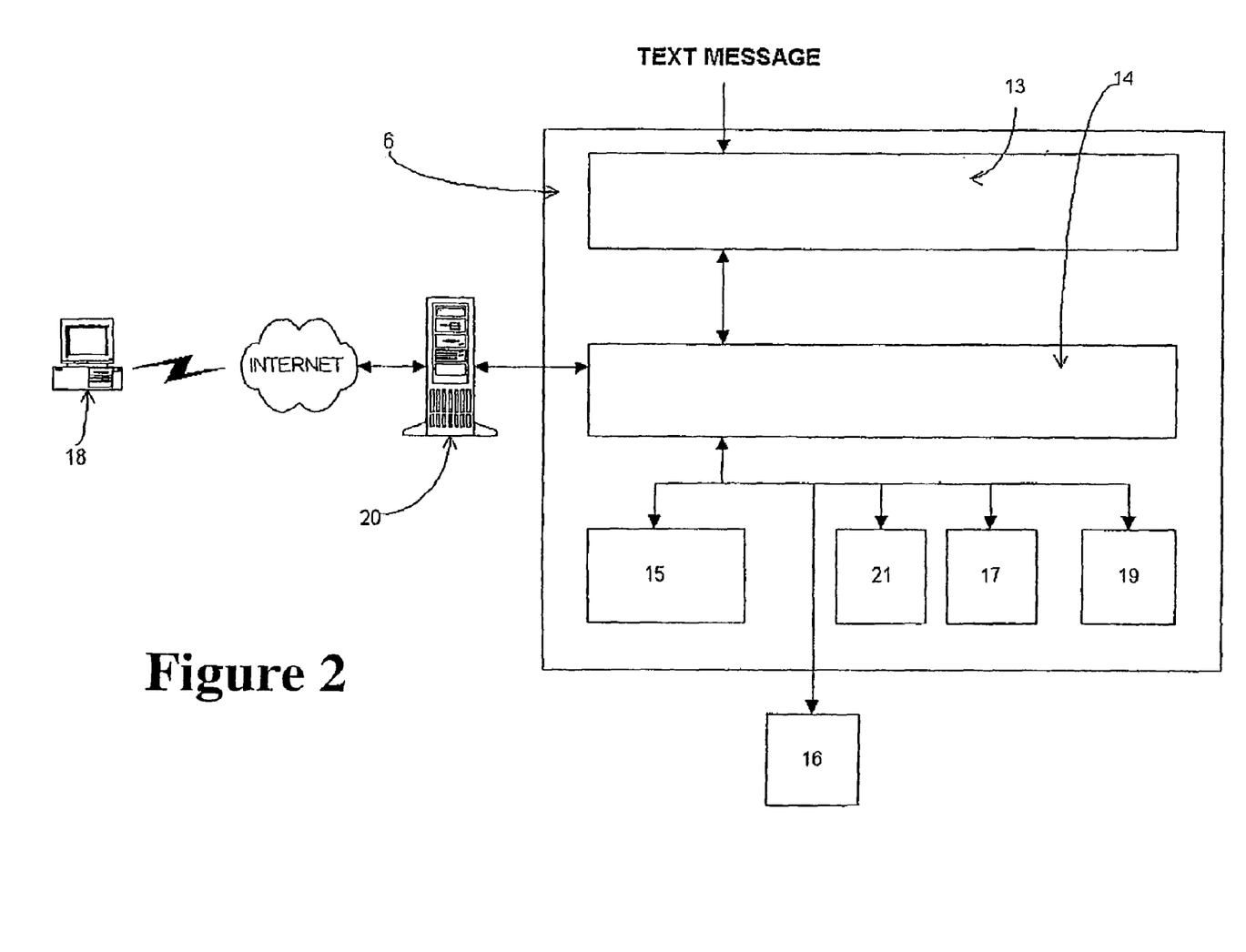
FIG. 2 is a block diagram of a portion of the network of FIG. 1, including a Short Message Entity Agent, and components of the network coupled thereto, to illustrate a system in accordance with the invention.

FIG. 2 illustrates, schematically the SMEA 6 of the present invention. The SMEA 6 comprises a gateway 13, a facilitator 14, and one or more message handlers 15, 16. The message handlers 15, 16 can be located internally (15) of the SMEA 6, or externally (16) of it.

Briefly, the gateway 13—the point of entry—deals with the diverse protocols of the sources of the messages received by the SMEA 6, and also performs unmarshalling—that is parsing the message to extract necessary information—and packaging the data into a format that the facilitator 14 can understand.

Gateways are, in themselves, well known to person skilled in the art, and as such need not be described in any further detail herein. In the present embodiment, the gateway 13 allows the facilitator 14 to communicate with different SMSC's and vice versa. The gateway 13 can also enable the facilitator to communicate with other messaging platforms, such as email, WAP, the World Wide Web, etc.

The facilitator 14 comprises one or more servers that facilitates and enables Message Service providers to configure and set up a value-added SMS. Once the service is configured, then the facilitator 14 is operable to demultiplex a received message from among many, and to dispatch it to the appropriate message handler(s) 15, 16.

Message handlers 15, 16 are programs that handle and process messages. Message handlers are, in themselves, well known, and, as such, need not be described in detail herein.

Figure 3:
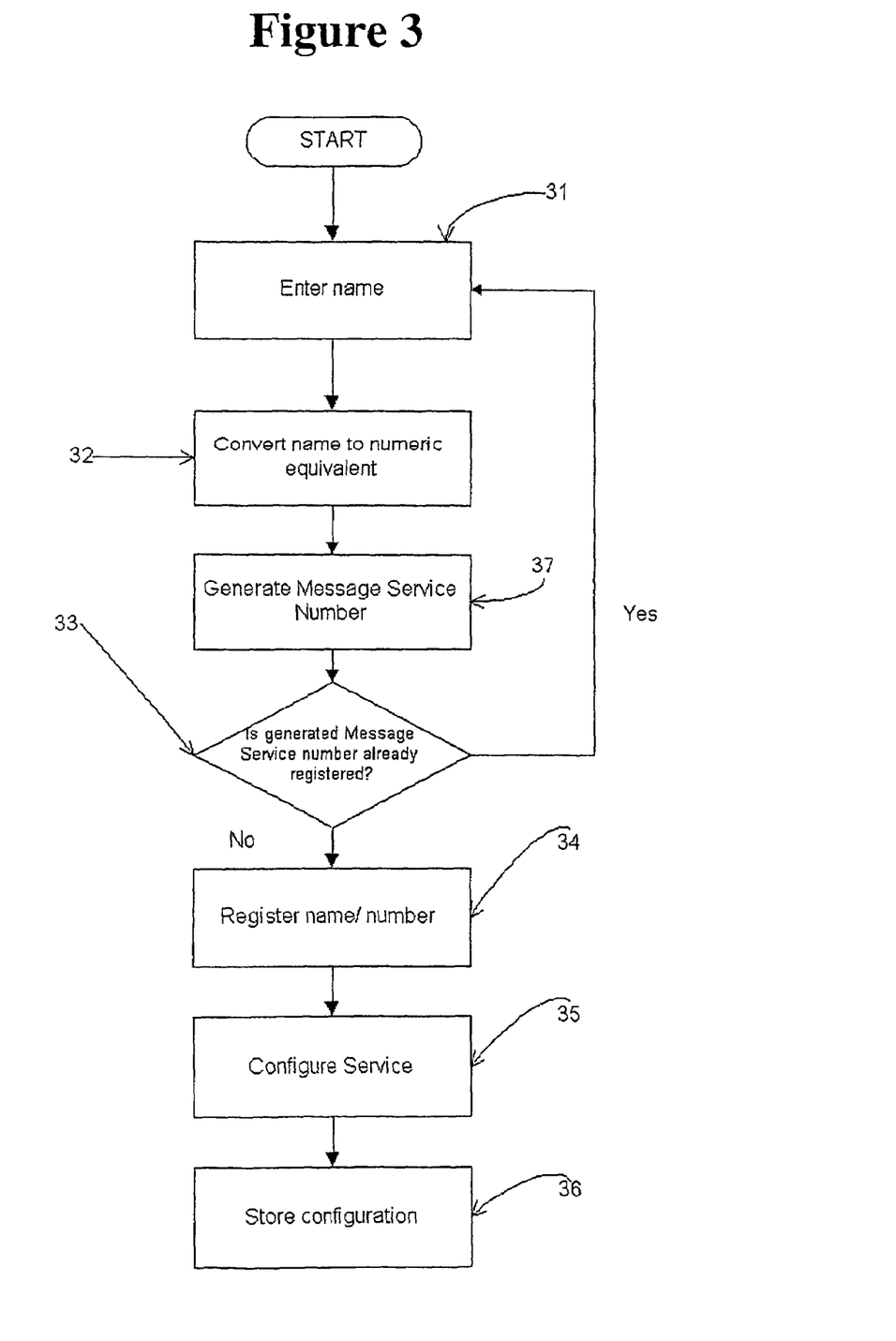
FIG. 3 is a flow chart illustrating the steps of the method of the present invention.

FIG. 3 is a flow diagram that illustrates the process that a content provider goes through to set up a Message Service.

To set up a Message Service, a Message Service provider uses the facilitator 14—as will be discussed in more detail below.

The invention will now be further described by way of an example.

Consider a business entity called the "Century Corporation" that wants to set up a Message Service that will be an SMS facility to handle customer enquiries. In this case, the Century Corporation will be the Message Service provider.

This corporation may decide that their Message Service is to be registered and known by the name "Century"—although any suitable name can be used provided it is available.

The first step is for the Century Corporation to register the name "Century" as the name (and also number—as will be described further below) that customers will use for SMS-based customer service enquiries. This registration is done through the SMEA service provider—that is the provider of the service that allows users such as the Century Corporation—to set up and configure their own Message Services.

A person acting on behalf of the business entity e.g. Century Corporation, is able to communicate with the facilitator 14 to set up and configure his Message Service e.g. his SMS-based customer enquiry service—via the Internet. This is done in the usual manner, for example, by means of a personal computer 18 connected to the Internet.

This person is able to communicate with the facilitator 14 in a known manner by accessing the service providers web site—by typing in the appropriate URL of the web page for the SMEA service provider, using a web browser and downloading a web page with the appropriate fields for entering data. The web site is hosted on a web server 20—as is well known to person skilled in the art. The facilitator 14 is coupled to the web server 20 to receive data therefrom, and send data thereto, in the usual manner. Data is received by the SMEA 6 and routed to the facilitator 14 via the gateway 13, and vice versa. The Internet, web sites and their use for the transfer data is well known, and, as such, need not be described in any further detail—except as is relevant to the present invention. When the person first visits the web site, he will be prompted to enter details such as name and address and will be either allocated, or will select, appropriate identification details such as a user ID and a password. This—again—can be done in any suitable, known, manner.

Once the person is in communication with the facilitator 14, then he is prompted to enter a name for his service (step 31 in FIG. 3). This name is then submitted to the facilitator 14. The facilitator 14 then converts the name into a numeric equivalent (step 32 in FIG. 3).

In this embodiment, the conversion uses the known algorithm—as is typified on telephone keypads—:

A, B, C=2
D, E, F=3
G, H, I=4
J, K, L=5
M, N, O=6
P, Q, R, S=7
T, U, V=8
W, X, Y, Z=9

Thus, the name "CENTURY" would be assigned the numeric equivalent of "2368879".

If available, this number will be used as a suffix to the SMSC Access code which is assigned to the SMEA 6 by the network operator, to provide a telephone number used, by customers, to access the Message Service using their SMS service from their mobile phones/PC's—step 37, FIG. 3. In other words, the whole telephone number—SMSC Access Code+suffix—will identify—to the SMSC 4—which SMEA 6 is running the appropriate value-added service, and—for the SMEA 6—which Message Service the text message relates to. In the example described above therefore, the number used by customers would be the SMSC Access Code+2368879. For an access code of, for example, 2345, the full number would be 2345 2368879. This number will be hereinafter referred to as the Message Service number. This will be described in more detail below.

It will also be readily understood that, although this specific embodiment described herein described a four-digit access code, other size access codes could be used. In addition, the full number may include extra digits relating to the country code of the network operator, and a portion identifying the network operator.

Each SMEA 6 may service more than one SMSC access code, if required.

The use of different access codes can facilitate aspects of the service such as billing, or can be used for other purposes.

For example, access codes could be based on how the messages are to be billed. In this example, "2340" could be used in services that are to be paid for by the content provider i.e. as toll-free services, while "2345" calls could be paid for by the caller, and "2399" could indicate a premium rate service.

The access code could also be used to indicate the nature of the Message Service provider e.g. "2340" could indicate a commercial business, "2341" a government organization, "2342" an educational institution etc.

The allocation of the appropriate access code is done by the facilitator 14. The access code can be allocated as a default, or can be actively determined by the facilitator 14. If it is actively determined, then the facilitator will need the appropriate information regarding the Message Service provider—for example, the nature of service, type of billing etc. This will be supplied by the Message Service provider upon registration, and will be used by the facilitator 14 to assign the appropriate access code.

The facilitator 14 then checks the generated Message Service number against a registry of number already stored in a database of numbers, hereinafter referred to as the number registry 17 (step 33 in FIG. 3). If this number is not already stored in the number registry 17, then it can be formally registered—step 34, FIG. 3. It is possible, therefore, to have the Message Service number 2340 CENTURY registered, as well as the number 2345-CENTURY—because they use different SMSC access codes.

The word used to determine the suffix will be limited by the available length of the suffix. Typically, a limit of 20 digits can be allocated to the full number to be used by a customer using the Message Service. As this includes the access code, plus any country and operator codes, the maximum limit for the suffix will be around 10 digits.

The person is then prompted—by means of further web pages downloaded to the PC 18- to enter further details such as the identification details of ID number and password, as well as payment details. Payment will be effected using known secure payment methods. Once all the identification details have been verified, and payment effected then the number equivalent to the selected name is stored in the number registry 17, and therefore registered. The number can be stored with or without related information, for example, as to who owns any registered number. This number is also stored in a look up table 19, with appropriate owner identification details. Although we have described these two databases as being separate, it will be readily understood that a single relational database could also be used.

Once the name (and therefore number) has been registered, then the person is able to set up and configure the Message Service—step 35, FIG. 3.

The Message Service is configured through a configuration screen provided through the service provider's web site. As usual, the configuration screen can only be accessed once appropriate identification details have been submitted.

Figure 4:
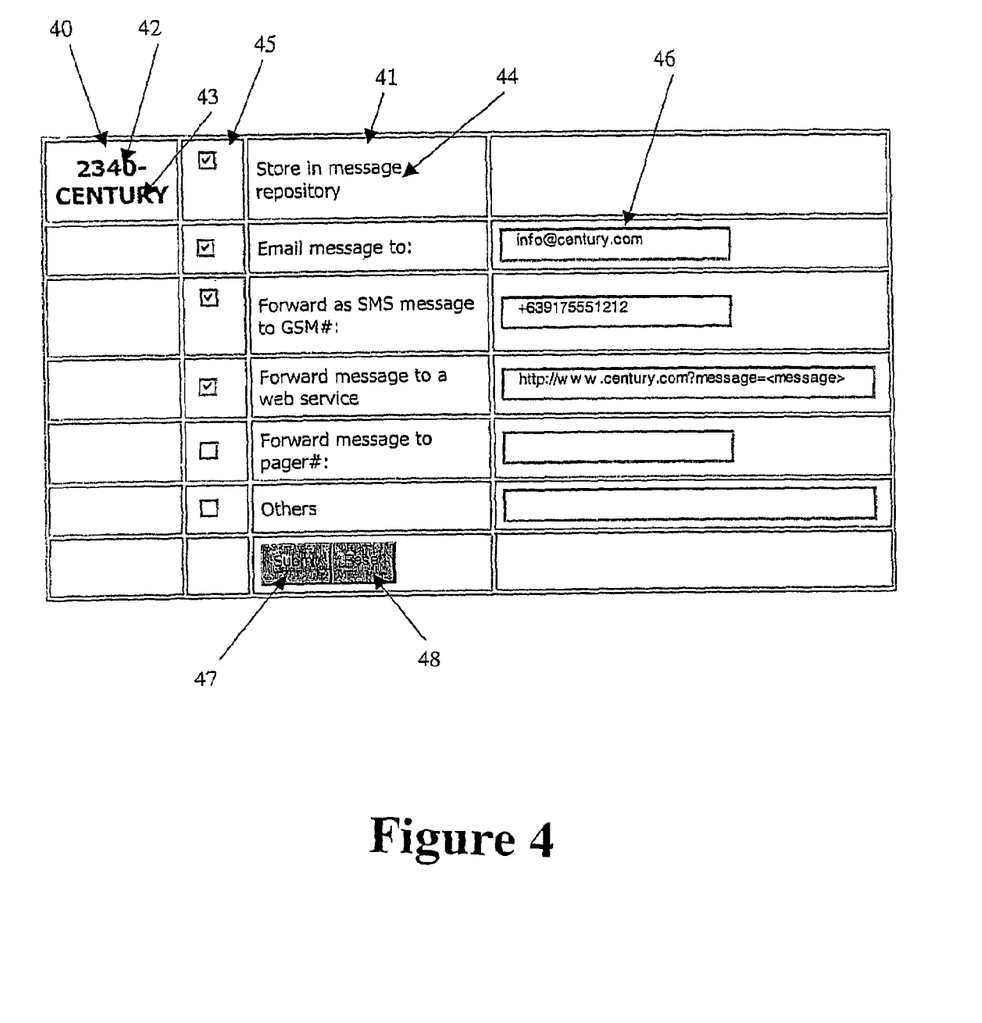
FIG. 4 is an example of a Configuration Screen as used by a user of the system.

FIG. 4 illustrates a configuration screen.

The Message Service number, "2340-CENTURY" 40, is indicated on the configuration screen 41, and, as mentioned above, comprises a service provider designated SMSC access code 42, and a number generated from the content provider's registered name 43—although on the screen it is preferably identified by the name (in this case "Century") rather than the numeric equivalent.

The Message Service is configured by selecting which of one or more message handlers are to be used by the service. Each available message handler 44 is indicated on the screen 41. In this embodiment, the following handlers are available:

Forward message to an email address
Store message for later viewing
Forward message to a mobile station
Forward message to a web service
Forward message to a pager Alternatively, the person can specify their own message handler—for example, http://www.cc.com/handlemessage?text=<message>, where handlemessage is the business entity's remote message handler, and <message> is the short message passed as a parameter to the remote message handler.

Each message handler 44 is selected by checking a checkbox 45.

Some message handlers, when selected, require a parameter 46. In this example, an email message handler requires an email address; the web handler, a URL, and so on.

So, for example, the service configured in FIG. 4 provides that SMS messages received by the SMEA 6 for the Business Message Service stored at an ESME, and identified by the suffix 2368879 i.e. CENTURY, will be forwarded to email info@century.com to mobile phone +639175551212, and to URL www.century.com.

Once all the message handlers have been selected—with parameters where appropriate—then the configuration is stored by clicking on the "Submit" button 47—step 36, FIG. 3. The reset button can be clicked to clear or reset the form fields to their default values—as is well known to persons skilled in the art FIG. 5 depicts the state diagram illustrating the different states, and the events that cause state transition in a Message Service.

Figure 5:
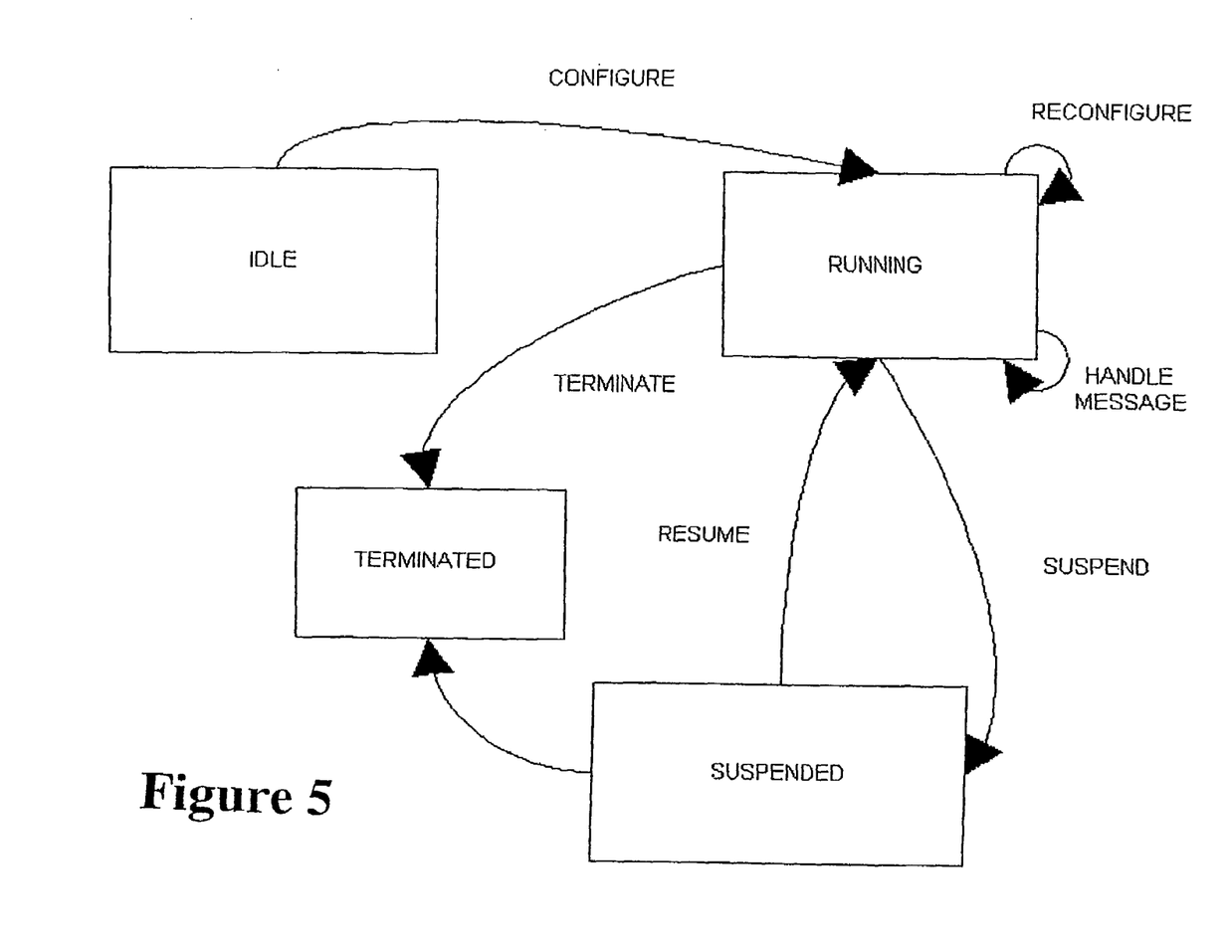
FIG. 5 is a state diagram illustrating the states and events for a Message Service of the present invention.

In the FIG. 5, the states are: idle, running, suspended, and terminated. The events that occur are: configure, reconfigure, handle message, suspend, resume, and terminate. After a Business Message Service's name has been registered, it is considered to be in an idle state; that is, it has not yet been configured.

After the "submit" button 47 has been clicked, the Message Service is configured and is considered provisioned—that is that it is up and running, and ready to receive and process messages.

Once the Message Service is configured and running, then one of four events can happen:

The Message Service can be reconfigured, that is new configurations can be set up—for example the message handlers can be changed. This can be achieved by accessing the SMEA service provider's web site—in the same manner as when the service is first configured, and accessing a reconfiguration or "manage service" web page. This page will look similar to the form on the configuration web page illustrated in FIG. 4. The primary difference between the two is that is the reconfiguration web page shows the current settings, whereas a new configuration would exhibit default settings. The Message Service does not have to be halted in order for it to be reconfigured—that is it continues processing messages based on the current configuration, until it is effectively reconfigured—again effected pressing the "submit" button, as in FIG. 4.

The Message Service can handle messages. While running, the Message Service processes all messages it receives, dispatching them to the appropriate as configured message handlers in accordance with the configuration.

The Message Service can be suspended by one of several parties:

i. The SMEA service provider (as embodied by the SMEA 6) may, for various reasons—account delinquency, violation of usage policy, breach of contract, etc.—suspend a Message Service.

ii. The network operator may also suspend a Message Service for similar reasons.

iii. A Message Service owner may suspend its service for its own reasons—service maintenance, upgrade, etc.

In all cases, the Message Service moves to a suspended state,

The Message Service can be terminated (perhaps by one of the parties who can also suspend the service).

From a suspended state, a Message Service can either be:

Resumed—for example, after a cause for suspension has been sufficiently addressed and rectified, then a Message Service can be resumed-after which, the service is back in a running state.

Terminated—in the same way as it can be terminated from a running state.

Figure 6:
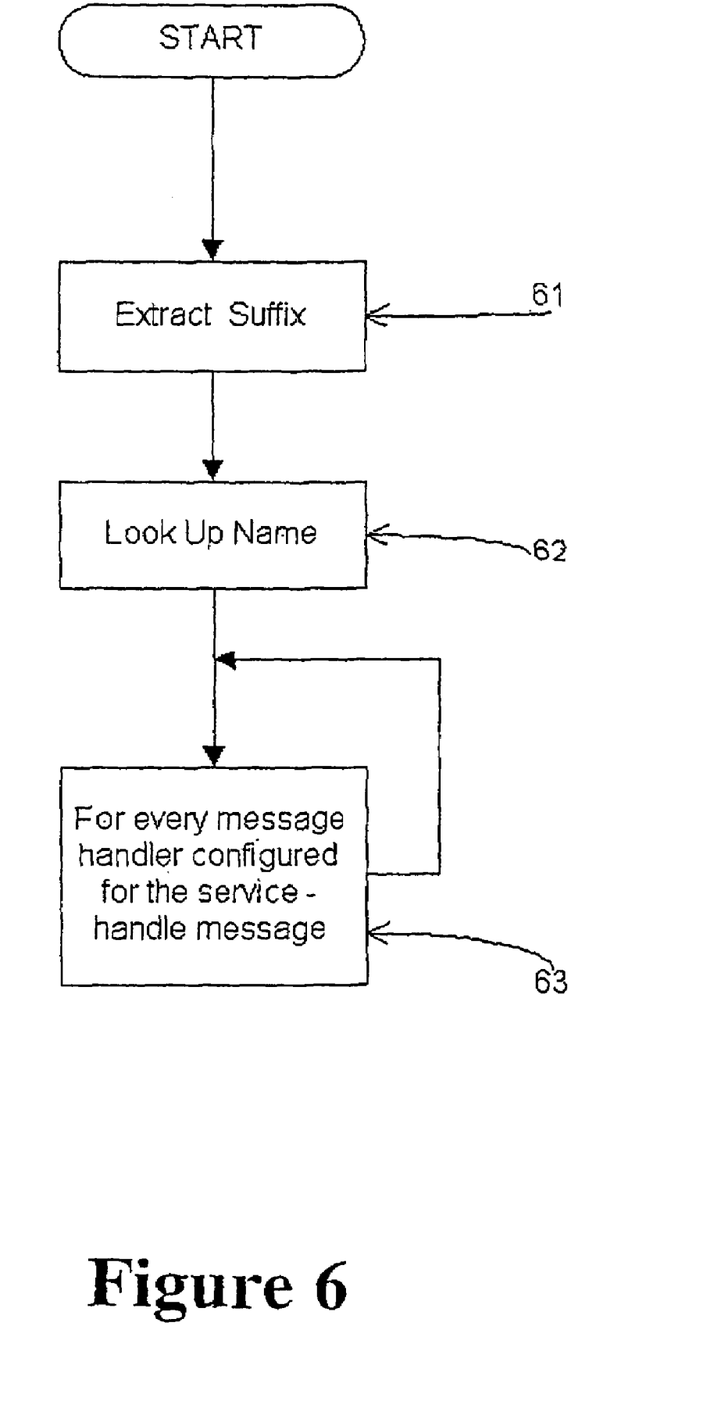
FIG. 6 is a flow chart illustrating how a message sent to a configured Message Service is processed.

The above state transitions have been discussed with regard to the transitions being initiated through Web (browser-based) access. However, SMS messages can be used to initiate these state transitions. For example, to suspend the Message Service, a "suspend Message Service" SMS text message could be sent to the SMEA 6 to suspend the Message Service in just the same way as a web-initiated suspension of the service—provided that the SMS text message is sent by a user with the proper access privileges and permissions, such as a Message Service administrator/owner, a radiotelephone network administrator, etc. It should be understood, therefore, that the web interface to the system is a preferred mode among many, FIG. 6 is a flow diagram illustrating how a message sent to a configured Message Service is processed. In this example, we shall use the afore-mentioned Message Service of the Century Corporation, which has been configured as described above and with respect to FIG. 4.

An SMS message from mobile station, number +639171234567 is sent to the Message Service number, 2340-CENTURY—that is 2340-236-8879–in the usual manner.

The text of the SMS message reads: "What is your web site address?"

The SMS message is sent from the mobile station having the number 639171234567 to the SMSC 4 from the base station serving the cell in which the mobile station is located. The SMSC 4 identifies that the message is intended for the SMEA 6 from the SMSC access code "2345" in the first part of the destination address for the message. The message is therefore passed, by the SMSC 4, to the appropriate SMEA 6—In a known manner. The message is received by the SMEA 6 (step 61 FIG. 6).

Upon receipt by the SMEA 6, the message is passed to the gateway 13, and from there to the facilitator 14.

The facilitator 14 is operable to extract the suffix from the destination address to determine which Message Service this message relates to. In the present example the suffix is 2368879–the numeric equivalent of CENTURY. This number is looked up in a look-up table 19 in the SMEA 6, which points to the service configuration of the Message Service— step 62, FIG. 6. When found, the configuration is loaded into the facilitator 14, which determines which message handlers are configured for this particular Message Service, and consequently forwards the text of the SMS message to the appropriate message handlers where it is handled as required—step 63, FIG. 6. Message handling execution can be handled sequentially or concurrently. The preferred embodiment handles messages concurrently.

In the above example, the message is first stored in a repository 21 (or "message log") provided in the SMEA 6, for later viewing by Message Service personnel, email is sent to info@century.com with the text body "What is your web site address?", the message is forwarded to the GSM# +639175551212, and the message is sent as a HTTP POST to the given URL address.

Thus, the Message Service provider—in the case the business entity, Century Corporation—is able to receive SMS text messages from customers and act on them as required.

It will be understood that various modifications, and alternatives are possible within the scope of the present invention. For example, although this embodiment has described a network using the GSM protocol—and SMS capability, the present invention is equally applicable for other cellular radiotelephone network protocols and text messaging services. Rather than using web-based set up and configuration for the Message Service, this could be done by SMS directly, using the manner of the present invention. Although the embodiment described the invention in relation to the provision of a Message Service, the invention can be used for other applications.

We claim:

1. A method for decentralized handling of text messages, within a text messaging system, the message being intended for a recipient, and the text message including means for uniquely identifying the provider of a text message service, the method including the steps of:
    the text message service provider self-provisioning the text message service in real-time through a facilitator, for handling messages;
    the facilitator identifying the text message service provider from the text message,
    the facilitator determining one or more message handlers provided in the system, and associated with the service provider from the provisioning, and
    the facilitator forwarding the text message to one or more appropriate destinations in accordance with the determined message handlers,
    wherein the message handlers to be associated with the text message service provider are selected by the text message service provider and the text message service is reconfigurable by the text message service provider in real-time to handle messages
    wherein the unique identifier is a numeric code and is part of the destination address included with the text message, and wherein the unique identifier comprises a portion that is a numeric translation of a word selected, and input to the system, by the service provider during a registration of the service provider; and translating the word to its numeric equivalent in accordance with a predetermined algorithm, combining the numeric translation with an access code to provide a message address which is included in the destination address, and checking the message address against those stored in a first database means in the system, and, where no match is detected, storing the message address in the first database means.

2. A system for handling text messages, the text messages including means for uniquely identifying a provider of a text message service, the system comprising:
    one or more message handling means selected by the provider of the text message service during a provisioning by the provider, for processing and forwarding text messages received by the system,
    a first database means storing a list of the unique identifiers for the providers of text message services,
    a second database means for storing details of the message handling means selected for each uniquely identified provider, and
    a decentralized control means operable, upon receipt of a text message, to identify the service provider from the unique identifier, wherein the unique identifier is a numeric code and is part of the destination address included with the text message, and to determine the selected message handling means based on the provisioning by the text message service provider so that the text message is forwarded to one or more appropriate destinations in accordance with the determined message handling means,
    wherein the control means is accessible in real time by the text message service provider to select required message handling means, the control means being operable to store details of the selected message handling means in the second database; and
    a third database means for storing details of numeric translations of input words, and wherein the control means is operable, in response to the input word, to translate the word to its numeric equivalent in accordance with a predetermined algorithm, to combine the numeric translation with an access code to provide a message address which is included in the destination address, and to check the message address against those stored in the third database, and, where no match is detected to store the message address in the first database means.

3. The system according to claim 2, wherein the unique identifier is generated by the control means in response to a word input to the control means by the service provider during a registration.

4. The system according to any one of claims 2 and 3, wherein the unique identifier comprises a portion that is a numeric translation of a word.

5. A method of self-provisioning a text message service by a text message service provider in a text messaging system, the method comprising the steps of:
    the service provider registering a unique identifier for the service,
    the service provider configuring the service through a facilitator in real time to handle messages, and
    storing the configuration of the selected message handlers, for the unique identifier;
    wherein the service is reconfigurable by the service provider in real time to handle messages; and wherein the unique identifier is a numeric code and is part of the destination address included with the text message, and wherein the unique identifier comprises a portion that is a numeric translation of a word selected, and input to the system, by the service provider during a registration of the service provider; and translating the word to its numeric equivalent in accordance with a predetermined algorithm, combining the numeric translation with an access code to provide a message address which is included in the destination address, and checking the message address against those stored in a first database means in the system, and, where no match is detected, storing the message address in the first database means.

* * * * *